United States Patent Office 3,629,265
Patented Dec. 21, 1971

3,629,265
7-HALO-4-ISOQUINOLONES
Guenter Grethe, North Caldwell, Hsi Lin Lee, West Paterson, and Milan Radoje Uskokovic, Upper Montclair, N.J., assignors to Hoffmann-La Roche Inc., Nutley, N.J.
No Drawing. Continuation-in-part of application Ser. No. 571,406, Aug. 10, 1966. This application Oct. 30, 1969, Ser. No. 872,767
Int. Cl. C07d 35/30, 35/32
U.S. Cl. 260—287                              3 Claims

ABSTRACT OF THE DISCLOSURE 4-isoquinolones bearing a halogen or hydroxy substituent on the phenyl ring are disclosed. The compounds are useful as blood pressure lowering agent and as intermediates for 1,2,3,4-tetrahydroisoquinolines useful as antihypertensive agents.

RELATED CASES

This application is a continuation-in-part of co-pending application Ser. No. 571,406 filed Aug. 10, 1966, and now abandoned.

DESCRIPTION OF THE INVENTION

The present invention relates to novel organic compounds, processes for preparing the same and intermediates useful in the preparation of said novel compounds.

Particularly, said novel organic compounds mentioned above are 4-isoquinolones. These novel compounds are useful in view of their blood pressure lowering effects and in view of their capability of being converted into 1,2,3,4-tetrahydroisoquinolines useful as antihypertensive agents.

More particularly, the 4-isoquinolones of the present invention are of the formula

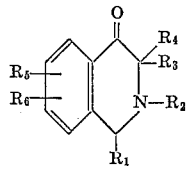

wherein $R_1$ is selected from the group consisting of hydrogen, lower alkyl, phenyl and halophenyl; $R_2$ is selected from the group consisting of hydrogen, lower alkyl, benzyl and substituted benzyl selected from the group consisting of benzyl substituted on the phenyl moiety with lower alkyl and halo, and α-lower alkyl-substituted benzyl; $R_3$ is selected from the group consisting of hydrogen, carboxy and lower alkoxycarbonyl; $R_4$ is selected from the group consisting of hydrogen and lower alkyl; $R_5$ and $R_6$ are each selected from the group consisting of hydrogen, halogen, lower alkoxy, lower alkyl and hydroxy, at least one of $R_5$ and $R_6$ being other than hydrogen.

The term "halogen" as used throughout the instant disclosure and claims is intended to connote all four forms thereof, unless otherwise specified. Especially preferred for the purposes of the present invention are chlorine and bromine. The expression "lower alkyl" is intended to connote both straight and branched chain hydrocarbon groups containing from 1–7 carbon atoms, preferably 1–4 carbon atoms, such as methyl, ethyl, propyl, butyl and the like. The expression "substituted benzyl" is intended to designate a benzyl group substituted in the α-position, for example, with a lower alkyl group, e.g., methyl or a benzyl group substituted in the phenyl nucleus thereof with a substituent such as lower alkyl, e.g., methyl, halo (chlorine) and the like. The term "lower alkoxy" represents a straight or branched chain hydrocarbonoxy group having 1–7 carbon atoms, preferentially methoxy and the like.

Preferred among the compounds of Formula I are those where at least one of $R_5$ or $R_6$ is hydroxy or halogen, preferably chlorine. Most preferred among the compounds of Formula I are those wherein $R_5$ is hydrogen and $R_6$ is hydroxy or halogen and is joined to the fused benzo moiety of the isoquinolone nucleus in the 7-position.

The compounds of Formula I above may be prepared by a variety of reaction routes. One preferred process aspect of the present invention is illustrated in the following diagrammatical flowsheet. The characters $R_1$–$R_6$ found in said flowsheet have the same meaning as ascribed thereto hereinabove; with $R_4$ preferably being hydrogen.

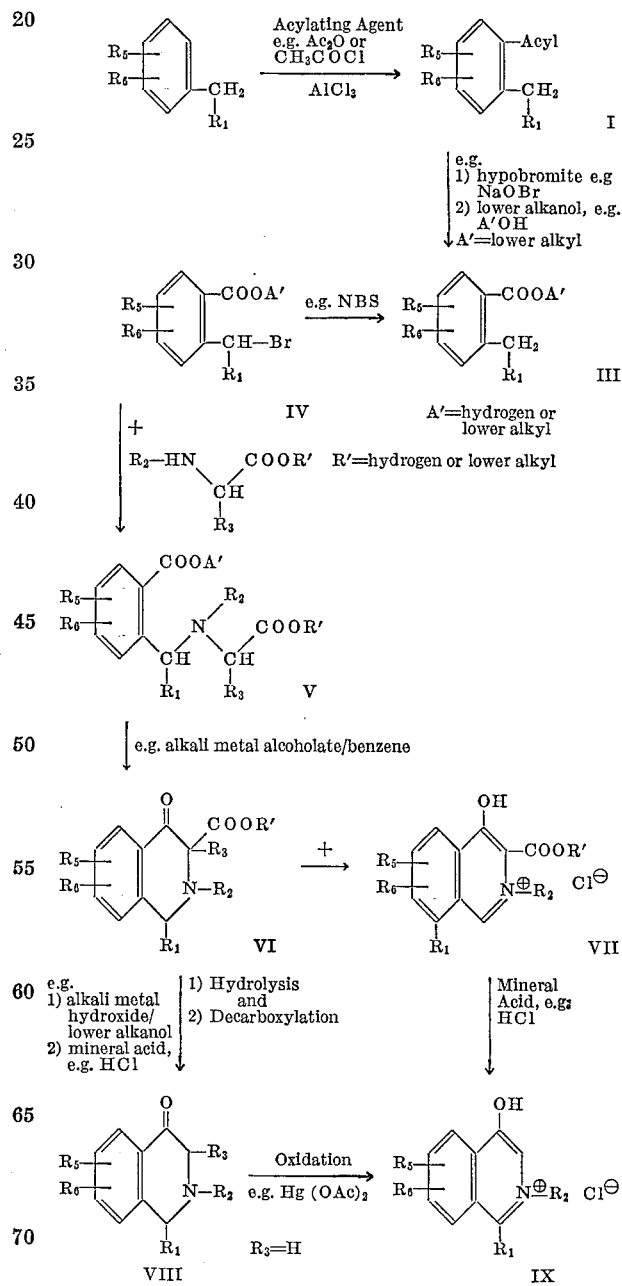

In the first stage of the process illustrated hereinabove, a toluene derivative is acylated utilizing any conveniently available acylating agent capable of effecting this end by procedures well established in the art, for example, utilizing the Friedel-Crafts technique. Thus, toluene or a substituted derivative thereof is treated with a lower alkanoyl anhydride, e.g., acetic anhydride or a lower alkanoyl halide, e.g., acetyl halide (acetyl chloride) whereby to obtain a compound of the Formula II above.

The resulting compound of the Formula II is then converted into the corresponding compound of the Formula III utilizing any system capable of providing a COOA' group in the 2-position of the toluene ring as shown in the above diagrammatical flowsheet. For example, a system comprising an alkali metal hypobromite, e.g., NaOBr and a lower alkanol, e.g., methanol, can be utilized to prepare a compound wherein A' is lower alkyl. In the first stage, i.e., the treatment with an alkali metal hypobromite, a compound of the Formula III above wherein A' is hydrogen, is prepared.

The conversion of a compound of the Formula III into the corresponding compounds of the Formula IV above constitutes a particularly efficacious process step in the procedure found in the above diagrammatical flowsheet. In this process step, the compound of the Formula III above is treated with N-bromosuccinimide in the presence of a free radical catalyst, for example, dibenzoyl peroxide, azo-bis-isobutyronitrile and the like. The so-obtained compound of the Formula IV above is then reacted with a glycine derivative of the formula

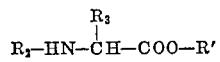

wherein $R_2$, $R_3$ and $R'$ are as above whereby to prepare the corresponding compound of the Formula V above.

The conversion of a compound of the Formula IV to the corresponding compounds of the Formula V is suitably effected in the presence of any conveniently available acid binding agent. Among the acid acceptors suitable for this purpose may be included tertiary amines such as tri-lower alkyl amines, e.g. triethyl amine and the like. In one process aspect, an acid acceptor can be provided in excessive amounts whereby it serves also as the solvent medium. By this simple expedient, there is provided to the reaction zone, a single substance which performs a dual function, namely, as the solvent medium and acid acceptor. In an alternate process aspect of the present invention, the reaction can be effected in the presence of an inert organic solvent such as an aromatic hydrocarbon, e.g. benzene, an ether such as diethyl ether and the like. The acid acceptor can be added to the solution of the reactant in the solvent medium.

The resulting compound of the Formula V above is then cyclized to obtain a mixture containing a compound of the Formula VI above in a major preportion and a compound of the Formula VII above in a minor proportion. The cyclization is effected with any base capable of effecting this end, such as alkali metal alcoholates, e.g. sodium ethoxide and the like, alkali metal hydrides, e.g. sodium hydride, sodamide and the like and similar type bases. It is preferred to effect the conversion of the compound of the Formula V into the said mixture in the presence of a suitable inert organic solvent such as an aromatic hydrocarbon, e.g. benzene, xylene and the like or a similar type solvent.

While temperature and pressure are not critical aspects of this process step, the cyclization of a compound of the Formula V above is advantageously conducted at elevated temperatures, most preferably at about the reflux temperature of the reaction medium.

Compounds of the Formula VI above, if desired, can be converted into the corresponding compounds of the Formula VII above by treatment of the former with an oxidizing agent such as mercuric acetate in the presence of acetic acid. Compounds of the Formula VI above, i.e. compounds of the Formula I above wherein $R_3$ is a lower alkyloxy carbonyl group, can be converted into the corresponding compound of the Formula I above wherein $R_3$ is hydrogen, i.e. a compound of the Formula VIII, by a two-step technique which involves in the first step a hydrolysis and then a decarboxylation according to techniques well documented in the literature. Where $R_3$ is a carboxy group, only decarboxylation is necessary. For example, the hydrolysis and decarboxylation of a compound of the Formula VI wherein $R_3$ is lower alkoxy carbonyl to the corresponding compound of the Formula I above can be effected by first adding sodium hydroxide to the reaction medium containing a compound of the Formula VI and then adding hydrochloric acid to the so-formed mixture. The two steps are preferably effected in the presence of a lower alkanol such as ethanol.

In the conversion of a compound of the Formula V above to a mixture of a compound of the Formulas VI and VII above, it was observed that the resulting compounds which comprise the mixture differ in basicity. This difference in basicity made the separation of these two components quite facile by techniques well documented in the literature.

Compounds of the Formulas VII and IX above wherein $R_2$ is a benzyl group can be debenzylated by catalytic hydrogenation to isoquinolines. Hydrogenolytic debenzylation of the isoquinoline salts at room temperature in acetic acid solution with palladium-on-carbon as the catalyst give the known 4-hydroxyisoquinolines of the Formula X.

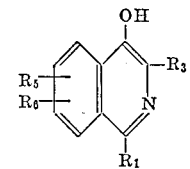

X

Compounds of the Formula I above, as is noted, if desired, can be converted into a wide variety of reaction products which ultimately lead to the known 1,2,3,4-tetrahydroisoquinolines mentioned above of established usefulness. For example, 1,2,3,4-tetrahydroisoquinolines of the formula

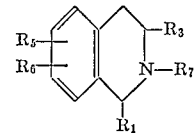

XI wherein $R_1$, $R_3$, $R_5$, and $R_6$ are as above and $R_7$ is selected from the group consisting of hydrogen and lower alkyl can be obtained by reducing the compounds of the Formula I above with any suitable system capable of effecting the removal of the ketone group in position 4 thereof. For example, the 1,2,3,4-tetrahydroisoquinolines of the Formula XI above can be prepared from the corresponding compounds of the Formula I by hydrogenation with 10% Pd/C in glacial acetic acid. When proceding along this path, there is also obtained 4-hydroxy-1,2,3,4-tetrahydroisoquinolines of the formula

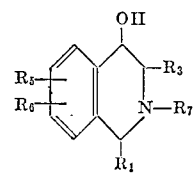

XII

When performing the reduction with Pd/C, elevated temperatures and elevated pressures are preferred, e.g. at about 90° C. and about 80 atms. Among the known compounds encompassed by the Formula XI, there may be included salsolin, salsolidine, carnegin and corypallia. Salsolin has long been employed as an anti-hypertensive agent.

In another reaction route, the compounds of the Formula I above wherein $R_3$ is hydrogen can be converted with 1,2-ethane dithiol to the thio ketals of the formula

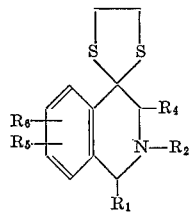

XIII wherein $R_1$, $R_2$, $R_4$, $R_5$ and $R_6$ are as above.

The resulting product of the Formula XIII can be desulfurized utilizing ethanol and Raney nickel to provide the desired 1,2,3,4-tetrahydroisoquinolines of the Formula XI above.

Compounds of the Formula I above can also be converted into compounds of the formula

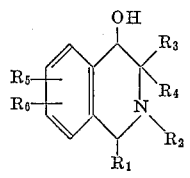

XIV wherein $R_1$–$R_6$ are as described above.

These 4-hydroxy tetrahydro isoquinolines are novel products and as such form a part of the present invention. If desired the so-obtained hydroxy derivatives can be esterified utilizing, for example, lower alkanoic acid anhydrides, e.g. propionic anhydride in the presence of pyridine to thereby prepare a compound of the formula

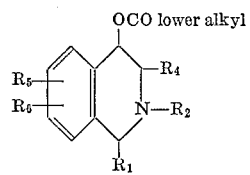

XV

However, it is of course understood that any suitable esterification system can be utilized for the purposes of the present invention.

Compounds of the Formula I wherein $R_3$ is selected from the group consisting of lower alkoxycarbonyl, i.e. compounds of the formula

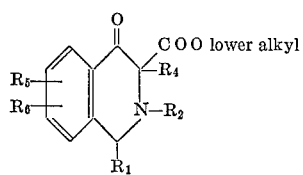

I-a can be converted into the corresponding 4-hydroxy compounds which contain a lower alkoxy carbonyl group, a —COOH group or a hydroxy-lower alkyl group. The reaction can be illustrated diagramatically as follows:

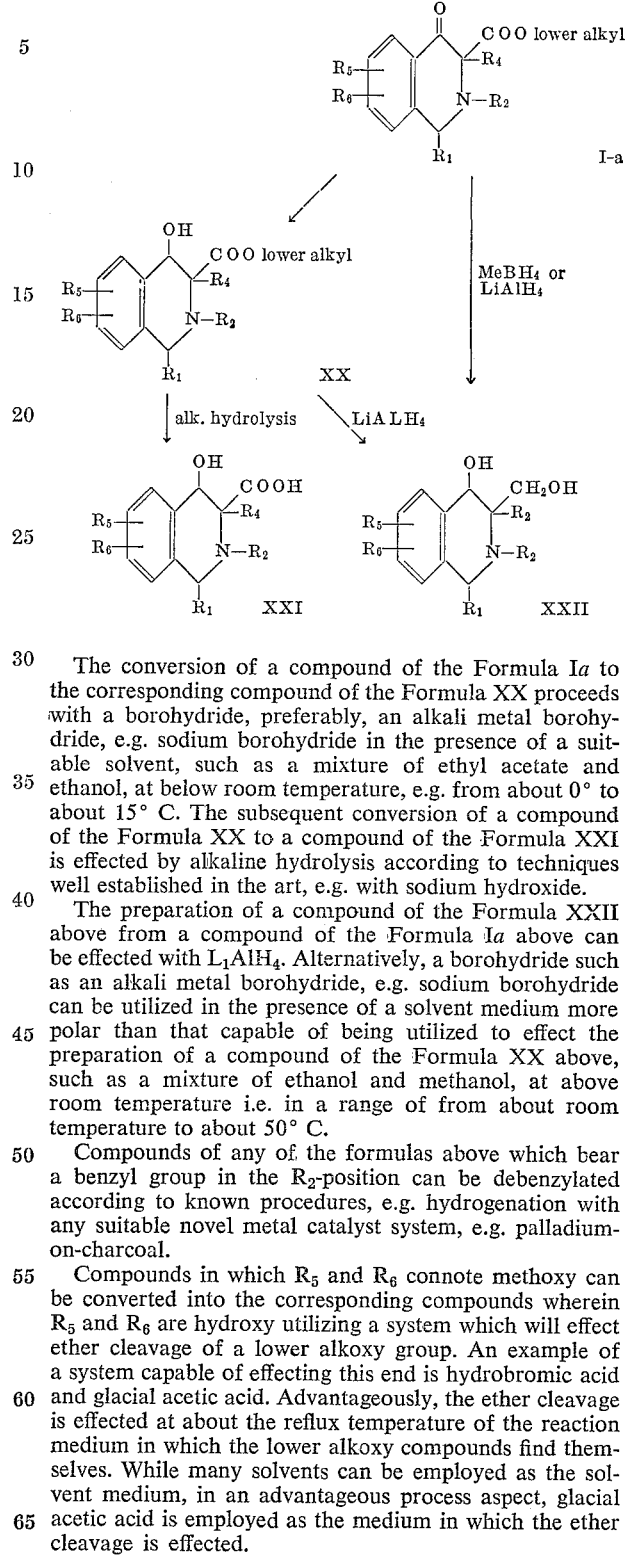

The conversion of a compound of the Formula Ia to the corresponding compound of the Formula XX proceeds with a borohydride, preferably, an alkali metal borohydride, e.g. sodium borohydride in the presence of a suitable solvent, such as a mixture of ethyl acetate and ethanol, at below room temperature, e.g. from about 0° to about 15° C. The subsequent conversion of a compound of the Formula XX to a compound of the Formula XXI is effected by alkaline hydrolysis according to techniques well established in the art, e.g. with sodium hydroxide.

The preparation of a compound of the Formula XXII above from a compound of the Formula Ia above can be effected with $Li AlH_4$. Alternatively, a borohydride such as an alkali metal borohydride, e.g. sodium borohydride can be utilized in the presence of a solvent medium more polar than that capable of being utilized to effect the preparation of a compound of the Formula XX above, such as a mixture of ethanol and methanol, at above room temperature i.e. in a range of from about room temperature to about 50° C.

Compounds of any of the formulas above which bear a benzyl group in the $R_2$-position can be debenzylated according to known procedures, e.g. hydrogenation with any suitable novel metal catalyst system, e.g. palladium-on-charcoal.

Compounds in which $R_5$ and $R_6$ connote methoxy can be converted into the corresponding compounds wherein $R_5$ and $R_6$ are hydroxy utilizing a system which will effect ether cleavage of a lower alkoxy group. An example of a system capable of effecting this end is hydrobromic acid and glacial acetic acid. Advantageously, the ether cleavage is effected at about the reflux temperature of the reaction medium in which the lower alkoxy compounds find themselves. While many solvents can be employed as the solvent medium, in an advantageous process aspect, glacial acetic acid is employed as the medium in which the ether cleavage is effected.

In addition to their capability of being converted into the pharmaceutically useful 1,2,3,4-tetrahydroisoquinolines, the compounds of Formula I above and their pharmaceutically acceptable salts are themselves effective as blood pressure lowering agents. The novel 4-hydroxy compounds of Formula XIV above likewise exhibit activity as blood pressure lowering agents. Their useful hypotensive activity is shown in warm blooded animals utilizing a standard primary blood pressure screening technique.

This test utilizes one anesthetized dog. Cartoid arterial blood pressures are recorded and a series of "control" responses of blood pressure and respiration are obtained. After the control responses are obtained, the drug to be tested is intravenously administered slowly over a five minute period at a dose not exceeding 10 mg./kg. The injection of the drug is terminated if a definite change in blood pressure occurs. Utilizing the standard procedure, the compounds of Formula I produce a blood pressure lowering effect. Following the standard test procedure, representative compounds such as those listed below exhibit blood pressure lowering activity at the indicated dosage levels:

2-benzyl-7-hydroxy-1,2-dihydro 4(3H) - isoquinolone hydrobromide, 4 mg./kg.;

2-benzyl-1,2,3,4-tetrahydro-4,7-isoquinolinediol hydrochloride, 4 mg./kg.;

1,2,3,4-tetrahydro-7-methoxy-2-methyl-1-phenyl-4 - isoquinolinol hydrochloride, 4 mg./kg.;

2 - benzyl-1,2,3,4-tetrahydro-7-methoxy-4-isoquinolinol hydrochloride, 4 mg./kg.

Among the most interesting members of the class encompassed by Formula I above are those compounds wherein $R_1$, $R_4$ and $R_6$ are all hydrogen, $R_2$ is benzyl, $R_3$ is selected from the group consisting of hydrogen and lower alkoxy carbonyl and $R_5$ is joined to the isoquinoline moiety at the 7-position and is selected from the group consisting of halogen, preferentially chlorine, and hydroxy.

Compounds of the Formulas XX, XXI and XXII are novel compounds and are antiinflammatory and norepinephrine potentiating agents. Preferred for this purpose are compounds of the Formulas XX, XXI and XXII wherein $R_4$ and at least one of $R_5$ and $R_6$ is hydrogen and $R_2$ is benzyl.

The compounds of the Formulae I and XIV above form non-toxic salts with pharmaceutically acceptable acids. These compounds can form such pharmaceutically acceptable salts with inorganic and organic acids such as hydrochloric acid, hydrobromic acid, phosphorus acid, citric acid, tartaric acid, toluene sulfonic acid, ascorbic acid, maleic acid, succinic acid, formic acid, acetic acid and the like.

The compounds of the Formulae I and XIV above can be administered in pharmaceutical dosage forms internally, for example, parenterally or enterally, with dosage adjusted to fit the exigencies of the therapeutic situation. The active ingredient can be incorporated in pharmaceutically acceptable inert carriers to thereby provide tablets dragees, suppositories, elixirs, emulsions, powders and the like according to conventional pharmaceutical dosage forms. The carrier for the pharmaceutical dosage forms may be water, lactose, magnesium stearate, talc, vegetable oils or any equivalent material.

The following examples are illustrative but not limitative to the present invention. All temperatures are stated in degrees centigrade.

EXAMPLE 1

To a solution of 13.96 g. of glycine ethyl ester hydrochloride in 100 ml. of methanol, there was added 6.8 g. of sodium ethoxide dissolved in 310 ml. of ethanol. The solvents were removed under vacuum, and the residue was suspended in dichloromethane. After removal of sodium chloride by filtration, the filtrate was evaporated to dryness under reduced pressure. The oily glycine ethyl ester was then dissolved in 200 ml. of abs. ethanol. A solution of 13.6 g. of m-methoxybenzaldehyde in 200 ml. abs. ethanol was added and the mixture was hydrogenated at room temperature and 10 atm. over 2 g. of platinum oxide until the hydrogen uptake ceased. After removal of the catalyst, the solvent was distilled off under reduced pressure to give N-(3-methoxybenzyl)-glycine ethyl ester as a yellow oil. 3 g. of the oil were dissolved in ether, and upon addition of isopropanolic hydrochloric acid, a crystalline material was obtained which after recrystallization from acetone gave pure N-(3 - methoxybenzyl)-glycine ethyl ester hydrochloride, M.P. 145–146°.

A solution of 16 g. of N-(3 - methoxybenzyl)-glycine ethyl ester and 10 ml. of triethylamine in 50 ml. of anhydrous ether was added to a stirred solution of 8.25 ml. of benzylchloride in 50 ml. of anhydrous ether. The mixture was kept at reflux with stirring for 50 hrs. After removal of the precipitate by filtration, the filtrate was evaporated to dryness to give a semi-crystalline residue, which was heated with a mixture of acetone/ether. The undissolved crystalline product [N-(3 - methoxybenzylglycine ethyl ester hydrochloride] was removed by filtration, the filtrate was evaporated to dryness, and the residue was distilled giving N-(3 - methoxybenzyl)-N-benzylglycine ethyl ester, B.P. 184° (0.75 mm.) Upon dissolution in ether and addition of excess isopropanolic hydrochloric acid, the crystalline hydrochloride was obtained, M.P. 111–115°. Recrystallization of the hydrochloride from acetone/ether raised the melting point to 112–117°.

EXAMPLE 2

The hydrochloride of 1,2-dihydro-2-benzyl-7-methoxy-4(3H)-isoquinolone was obtained by dissolving the free base in methanol and acidifying with 1 N methanolic hydrochloric acid. After addition of ether to the solution, the hydrochloride precipitated as crystalline product, M.P. 213–215°. The hydrochloride (10 g.) was dissolved in 200 ml. of glacial acetic acid with warming to 70°. After addition of the catalyst (1.2 g.; 10% palladium on charcoal), the mixture was hydrogenated at room temperature under normal pressure until the theoretical amount of hydrogen, necessary for debenzylation, had been taken up. This required about 2.5 hrs. The catalyst was filtered and the filtrate was evaporated to dryness under reduced pressure. The solid residue was washed with ether giving 1,2-dihydro - 7 - methoxy-4(3H)-isoquinolone hydrochloride, M.P. 220–222°. Recrystallization of the product from methanol/ether raised the melting point to 224–225°.

EXAMPLE 3

To a solution of 9.3 g. of 2-benzyl-1,2-dihydro-7-methoxy 1 - methyl-4(3H)-isoquinolone hydrochloride in 200 ml. of glacial acetic acid was added 1.2 g. 10% palladium on charcoal catalyst, and with stirring the mixture was hydrogenated at normal pressure at a starting temperature of 60°. This temperature was kept for 5 min. and then the mixture was allowed to cool to room temperature while still under hydrogen. After 2.5 hrs., the catalyst was removed by filtration, and the filtrate was evaporated to dryness in vacuum. The solid residue was washed with ether and recrystallized from ethanol giving 1,2-dihydro-7 - methoxy-1-methyl-4(3H)-isoquinolone hydrochloride, M.P. 208–210°. Recrystallization from ethanol raised the melting point to 213–214°.

EXAMPLE 4

To a solution of 2.2 g. of 2-benzyl-1,2-dihydro-6,7-dimethoxy-4(3H)-isoquinolone hydrochloride in 100 ml. of warm glacial acetic acid was added 0.4 g. of catalyst (10% palladium on charcoal). The mixture was hydrogenated at normal pressure and room temperature for 2 hrs. During this time, a crystalline product precipitated in the reaction mixture. The hydrogenation therefore was continued for 2 hrs. at 50°. After cooling to room temperature, the catalyst was removed by filtration and washed thoroughly with hot methanol. Removing of the solvents under reduced pressure gave a solid residue which was washed with ether to yield crystalline 1,2 - dihydro-6,7-dimethoxy-4 (3H) - isoquinolone hydrochloride, M.P. 218–220°. Recrystallization from methanol gave the product [1,2-dihydro - 6,7-dimethoxy-4(3H)-isoquinolone hydrochloride], M.P. 237–238°.

EXAMPLE 5

A mixture of 1 g. of 2-benzyl-1,2-dihydro-7-methoxy-4(3H)-isoquinolone and 150 mg. of 5% palladium on charcoal in 50 ml. of glacial acetic acid was hydrogenated at normal pressure and room temperature until the hydrogen uptake ceased. Removal of the catalyst by filtration was followed by evaporation of the filtrate to dryness under vacuum. The oily residue was dissolved in ether and, upon addition of isopropanolic hydrochloric acid, crystalline 7 - methoxy-1,2,3,4-tetrahydro-4-isoquinolinol hydrochloride was obtained. Recrystallization from ethanol gave the isoquinolinol hydrochloride of 168–170°.

EXAMPLE 6

A mixture of 8 g. of 2-benzyl-1,2-dihydro-7-methoxy-1-methyl-4(3H)-isoquinolone and 0.9 g. 10% palladium on charcoal in 320 ml. of glacial acetic acid was hydrogenated at normal pressure and room temperature for 1 hr. Hydrogenation then was continued for 1.5 hrs. at 60–70° and at room temperature overnight. The mixture was filtered and the filtrate evaporated to dryness under vacuum. The residue was dissolved in isopropanol, an excess of isopropanolic hydrochloric acid was added, and after addition of ether to the solution, a crystalline precipitate was obtained, which was recrystallized from ethanol giving 7-methoxy - 1-methyl-1,2,3,4-tetrahydro-4-isoquinolinol hydrochloride, M.P. 174–175°.

EXAMPLE 7

To a solution of 60.8 g. of 3,4-dimethoxytoluene and 39.6 ml. of acetic anhydride in 500 ml. of tetrachloroethane cooled to 0° was added, with stirring, 112 g. of aluminum chloride at such a rate as to keep the temperature of the reaction mixture at 0–5°. After the addition was completed, the solution so-formed was stored for 2 days at 5°, and then was poured onto 800 g. of ice. The product was extracted with dichloromethane, the organic extract was washed with aqueous sodium carbonate solution and water, dried and filtered. The filtrate was evaporated to dryness under reduced pressure, and the residue was recrystallized from ether/petroleum ether to give 4,5-dimethoxy-2-methyl-acetophenone, M.P. 73–75°.

EXAMPLE 8

A solution of sodium hypobromite, prepared at 0° by dissolving 84 g. (2.1 moles) of sodium hydroxide and 30 ml. (0.552 mole) of bromine in 400 ml. of water, was added slowly over a period of 30 min. to a stirred solution of 22 g. (0.134 mole) of 4-methoxy-2-methyl-acetophenone in 250 ml. of dioxane. During the addition, the temperature was allowed to rise to 30°. After warming the mixture to 40° and stirring for an additional 15 min. at this temperature, the suspension was treated with enough sodium bisulfite to destroy the excess hypobromite, and 1.5 l. of water was added. The mixture was allowed to stand at room temperature overnight. After removal of ca. 400 ml. of the solvents under reduced pressure, the hot solution was acidified with 3 N hydrochloric acid to give a crystalline precipitate. This was collected by filtration and dried under vacuum at 50°. Recrystallization from benzene gave 4-methoxy-2-methyl-benzoic acid, M.P. 178–180°.

4,5-dimethoxy-2-methyl-benzoic acid was prepared by sodium hypobromite oxidation from 25 g. of 4,5-dimethoxy-2-methyl-acetophenone as described above. Without recrystallization, the so-prepared product was crystalline and had a melting point, 146–148°.

EXAMPLE 9

A solution of 125 g. of 4-methoxy-2-methyl-benzoic acid and 12 ml. of concentrated sulfuric acid in 1000 ml. of anhydrous methanol was kept at reflux for 15 hours. After removal of 500 ml. of the solvent under vacuum, 500 ml. of ether was added to the residue, and the solution was washed once with a diluted aqueous solution of sodium carbonate and then with water. The ethereal solution was dried, filtered, and the filtrate evaporated to dryness under reduced pressure. The oily residue remaining was distilled under vacuum giving 4-methoxy-2-methyl-benzoic acid methyl ester, B.P. 92° (0.25 mm.).

EXAMPLE 10

A solution of 100 g. of 4,5-dimethoxy-2-methyl-benzoic acid and 10 ml. of concentrated sulfuric acid in 1000 ml. of anhydrous ethanol was kept at reflux for 2 days. After 500 ml. of solvent was removed under reduced pressure, 500 ml. of ether was added to the solution, and the mixture was washed with a diluted aqueous solution of sodium carbonate and then with water. The ethereal solution was dried and filtered. The filtrate was evaporated to dryness under reduced pressure. The solid residue remaining was crystallized from ether-petroleum ether to give 4,5-dimethoxy-2-methyl-benzoic acid ethyl ester, M.P. 62–63°.

EXAMPLE 11

To a boiling mixture of 190 g. of m-chlorotoluene and 229.5 g. of aluminum chloride in 1500 ml. of carbondisulfide was added with stirring 123 ml. of acetyl chloride. Heating at reflux and stirring was continued for 1 hour. The mixture was poured onto 2 l. of a mixture of ice and concentrated hydrochloric acid (ratio 1:1) and extracted several times with a benzene-ether mixture. The combined organic extracts were washed with water, dried and filtered. After removal of the solvents, the residue was purified by fractional vacuum distillation giving a clear liquid, B.P. 126° (16 mm.).

The liquid was added rapidly at 20–25° to a solution of sodium hypobromite, prepared at 0° by dissolving 537 g. of sodium hydroxide and 171 ml. of bromine in 2.2 l. of water. Stirring was continued for 1.5 hours at room temperature. After addition of ca. 250 g. of sodium bisulfite, the mixture was stirred for 30 min., washed with ether, acidified with concentrated hydrochloric acid and extracted repeatedly with chloroform. The combined organic extracts were washed with water, dried and filtered. After removal of the solvent under vacuum, a solid material, consisting mainly of the two isomeric acids, was obtained. The resulting mixture was dissolved in 1.2 l. anhydrous ethanol, 20 ml. of concentrated sulfuric acid was added and the solution was kept at reflux for 3 days. After removal of most of the solvent under reduced pressure, the residue was diluted with a benzene-ether mixture and washed twice with a diluted aqueous sodium bicarbonate solution and subsequently once with water. The organic solution was dried and filtered. Evaporation to dryness under vacuum gave an oily residue, which was purified by fractional distillation under reduced pressure. The collected fractions were analyzed by VPC (10% DEGS on Anakrom ABS; 125° C.; 100 cc./min. $N_2$). The first fraction, a light oil: B.P. 132° (14 mm.); $n_a^{24}$ 1.5268; was found to be crude 4-chloro-2-methyl-benzoic acid ethyl ester.

EXAMPLE 12

A mixture of 18 g. of 4-methoxy-2-methyl-benzoic acid methyl ester, 17.5 g. of N-bromosuccinimide and 2 g. of dibenzoylperoxide in 200 ml. carbon tetrachloride was heated at reflux temperature for 4 hrs. The succinimide was removed by filtration, and washed thoroughly with carbon tetrachloride. The filtrate was washed with a dilute aqueous sodium carbonate solution and subsequently with water. The so-washed medium was dried, filtered and the solvent was removed under vacuum giving a yellow oil. The oil was crystallized with ether-petroleum ether. The crystalline material was collected by filtration and dried to give α-bromo - 4 - methoxy - o - toluic acid methyl ester, M.P. 66–67°.

EXAMPLE 13

A mixture of 48.5 g. of 4,5-dimethoxy-2-methyl-benzoic acid ethyl ester, 35.5 g. of N-bromosuccinimide and 1 g. of dibenzoylperoxide in 500 ml. of carbon tetrachloride was heated at reflux for 2 hrs. The succinimide was removed by filtration and washed with carbon tetrachloride. The filtrate was washed with dilute aqueous sodium hydroxide solution and then twice with water. The so-washed solution was dried, filtered and the solvent was removed under reduced pressure. The residue was crystallized from ether-petroleum ether giving crystalline α-bromo - 4,5 - dimethoxy-o-toluic acid ethyl ester, M.P. 78–81°.

EXAMPLE 14

Sarcosine ethyl ester was prepared by passing dry hydrochloric acid through a suspension of 50 g. of sarcosine in 500 ml. of anhydrous ethanol, the heat of the reaction eventually boiling the solution. The now clear solution was kept at reflux for 2 hrs., while still passing the hydrochloric acid through the solution. The solvent was removed under reduced pressure, and 30 ml. 8 N sodium hydroxide was added to the syrupous residue. Ether (100 ml.) was added, and enough potassium carbonate to transform the aqueous layer into a thick semisolid layer. The ether was decanted, the residue was extracted twice more with ether, and the combined ethereal solutions were dried ($K_2CO_3$) overnight, filtered and evaporated to dryness at room temperature under vacuum. Vacuum distillation of the residue gave sarcosine ethyl ester: B.P. 68° (41 mm.) (Lit [1] B.P. 52°/15 mm.).

A solution of 16.22 g. of sarcosine ethyl ester and 21 g. of α-bromo - 4,5 - dimethoxy-o-toluic acid ethyl ester in 120 ml. of anhydrous ether was heated at reflux with stirring for 15 hrs. The mixture was diluted with 100 ml. of benzene and washed twice with water. The organic solution was dried, filtered and concentrated to give a yellow oil. The oil was dissolved in an excess of 0.1 N ethanolic hydrochloric acid, the solvent was removed under reduced pressure, and the oily residue crystallized on standing. After addition of acetone the crystalline material was collected by filtration to give N-(2 - carbethoxy - 4,5 - dimethoxybenzyl)sarcosine ethyl ester hydrochloride, M.P. 120–127°. Recrystallization twice from acetone-ethyl acetate raised the melting point of the product to 128–131°.

EXAMPLE 15

To a stirred solution of 35.4 ml. of ethyl chloroacetate in 150 ml. of anhydrous ether was dropped a solution of 68.1 ml. of benzylamine and 125 ml. of triethylamine within 20 min. The reaction mixture was heated at reflux for 3 days with stirring. The precipitated triethylamine hydrochloride was removed by filtration, and the filtrate was concentrated under reduced pressure. Vacuum distillation of the residue gave N-benzylglycine ethyl ester: B.P. 103–107° (0.3 mm.) [Lit [2] B.P. 165° (16 mm.)]. A solution of 19.3 g. of N-benzyl-glycine ethyl ester and 14 ml. of triethylamine was added dropwise to a stirred solution of 30.3 g. of α-bromo-4,5-dimethoxy-o-toluic acid ethyl ester in 100 ml. of anhydrous ether. After heating at reflux with stirring for 20 hours, the reaction mixture was diluted with ether-benzene, washed with water, dried and filtered. Concentration of the filtrate gave an oil which was dissolved in ethanol. The ethanolic solution was saturated with dry hydrochloric acid, and upon addition of ether crystalline N-benzyl-N-(2 - carbethoxy - 4,5 - dimethoxybenzyl)-glycine ethyl ester hydrochloride was obtained, M.P. 137–139°. Recrystallization twice from chloroform-ether gave the product, M.P. 137.5–140°.

[1] Dalgliesh and F. G. Mann, J. Chem. Soc., 121, 2207 (1922).
[2] Manson and Winder, J. Chem. Soc., 65, 188 (1894).

EXAMPLE 16

To a suspension of 25.9 g. of α-bromo - 4 - methoxy-o-toluic acid methyl ester in 50 ml. of anhydrous ether, there was added a solution of 19.3 g. of N-benzyl glycine ethyl ester and 14 ml. of triethylamine. The mixture was heated at reflux with stirring for 20 hrs. After washing with water, the organic solution was dried, filtered and concentrated under reduced pressure. The crude oil was purified by vacuum distillation to give oily N-benzyl-N-(2 - carbomethoxy - 5 - methoxybenzyl)-glycine ethyl ester, B.P. 215–220° (0.4 mm.).

EXAMPLE 17

A solution of 15.75 g. of N-benzyl-N-(2-carbomethoxy - 5 - methoxybenzyl) - glycine ethyl ester in 100 ml. of azeotropically dried benzene was added under nitrogen with stirring within 20 min. to 3.44 g. of sodium ethoxide. After such addition was completed, the mixture was heated (oil bath temperature 92–94°) with stirring for three hours with slow distillation of an azeotropic mixture of ethanol-benzene, which was collected in a Dean-Stark trap. After cooling to room temperature, the mixture was diluted with 150 ml. of water, concentrated hydrochloric acid was added with vigorous stirring until the aqueous layer reached pH 4. The organic solution was separated, and the aqueous layer was extracted several times with ether. The combined organic solution was washed with water, dried and filtered. Concentration of the filtrate under reduced pressure gave an oil which crystallized upon addition of ethanol to yield 2-benzyl-3-carbethoxy - 1,2 - dihydro - 7 - methoxy - 4(3H) - isoquinolone, M.P. 103–107°. Recrystallization from ethanol gave the product of M.P. 101–107°.

The hydrochloride of 2-benzyl - 3 - carbethoxy-1,2-dihydro - 7 - methoxy - 4(3H) - isoquinolone was prepared by dissolving the free base in an excess of 1 N ethanolic hydrochloric acid and addition of ether to the so-formed solution. The crystalline precipitate was collected by filtration and recrystallized from ethanolether giving the hydrochloride M.P. 170–174° (dec.).

EXAMPLE 18

A solution of 7.55 ml. ethanol containing 362 mg. sodium ethoxide was added to a solution of 2 g. of N-(2-carbethoxy-4,5-dimethoxybenzyl)sarcosine ethyl ester hydrochloride in 20 ml. of ethanol. The solvent was removed under reduced pressure, the residue was suspended in 25 ml. of dichloromethane, the insoluble part was removed by filtration and concentration of the filtrate under vacuum gave the oily free base of N-(2-carbethoxy-4,5-dimethoxybenzyl)sarcosine ethyl ester hydrochloride. This was dissolved in 15 ml. of azeotropically dried benzene, and the solution was added under nitrogen with stirring for 45 min. to 480 mg. of sodium ethoxide over a period of 15 min. After completed addition, the mixture was heated under nitrogen (oil bath temperature 90°) with stirring for 45 min. with slow distillation of an azeotropic ethanol-benzene mixture which was collected in a Dean-Stark distilling receiver. The mixture was cooled to room temperature, diluted with 50 ml. of benzene and 50 ml. of water. The mixture was acidified to Congo red by adding concentrated hydrochloric acid with shaking. After adding excess sodium bicarbonate, the organic layer was separated, and the aqueous layer was extracted with benzene. The combined organic solution was washed with water, dried and filtered. Concentration of the filtrate under vacuum gave an oil which was dissolved in 0.1 N hydrochloric acid. Addition of ether to the solution gave 3-carbethoxy-6,7-dimethoxy - 4 - hydroxy-2-methyl-isoquinolinium chloride, M.P. 230–231° (dec.). The mother liquor from the preparation of 3-carbethoxy-6,7-dimethoxy-4-hydroxy-2-methyl-isoquinolinium chloride above was concentrated under reduced pressure. The so-obtained residue was dissolved in ethanol, and dry hydrochloric acid was passed through the solution until pH 1. Addition of ether gave yellow, crystalline 3 - carbethoxy - 1,2 - dihydro - 6,7-dimethoxy-2-methyl-4(3H)-isoquinolone hydrochloride, M.P. 131°. Recrystallization from ethanol-ether and drying for 3 days at 40° under reduced pressure gave the product of melting point 105–152° (vac.).

EXAMPLE 19

To a solution of 30 g. of N-benzyl-N-(2-carbethoxy-4,5-dimethoxybenzyl)-glycine ethyl ester hydrochloride in 200 ml. of ethanol, there was added a solution of 4.52 g. of sodium ethoxide in 128 ml. abs. ethanol. The solvent was removed under reduced pressure, the residue was suspended in 200 ml. of dichloromethane, and the insoluble part was removed by filtration. The filtrate was concentrated under vacuum and the free base of N-benzyl-N-(2-carbethoxy-4,5-dimethoxybenzyl)-glycine ethyl ester hydrochloride thus obtained was dissolved in 150 ml. of azeotropically dried benzene. This solution was added under nitrogen to 5.65 g. sodium ethoxide with stirring over a period of 25 min. After completed addition, the clear solution was heated (at bath temperature 92–94°) under nitrogen with stirring and slow distillation of an azeotropic mixture of ethanol-benzene. After heating for 1 hr. the solution became turbid. Heating was continued for 2 hrs., and after cooling to room temperature, 150 ml. of water was added to the mixture. Conc. hydrochloric acid was added dropwise with shaking until the aqueous layer reached pH 4. The benzene solution was separated, the aqueous layer was extracted several times with ether, and the combined organic solution was washed with water, dried, filtered, and concentrated under reduced pressure giving an oil, which was dissolved in excess saturated ethanolic hydrochloric acid. Upon addition of ether to the solution, crystalline 2 - benzyl-3-carbethoxy-1,2-dihydro-6,7-dimethoxy-4(3H)-isoquinolone hydrochloride was obtained, M.P. 170–172°. To the aqueous layer was added excess sodium bicarbonate, and after extraction with chloroform, the organic extracts were washed with water, dried, filtered and concentrated under vacuum. The oily residue was dissolved in excess saturated ethanolic hydrochloric acid and treated with ether giving crystalline 2-benzyl-3-carbethoxy-1,2-dihydro - 6,7-dimethoxy-4(3H)-isoquinolone hydrochloride, M.P. 166–167°. After several crystallizations of the mother liquor and recrystallization of the collected crystalline material from ethanol, a crystalline product, M.P. 192–194°, was obtained which was 2-benzyl-3-carbethoxy-6,7-dimethoxy-4-hydroxy-isoquinolinium chloride.

EXAMPLE 20

A mixture of 50 g. of 4-chloro-2-methyl-benzoic acid ethyl ester, 44.75 g. of N-bromosuccinimide (NBS) and 500 mg. of dibenzoylperoxide in 400 ml. of carbon tetrachloride was heated at reflux until all NBS was converted to succinimide, which took about 2–3 hrs. The succinimide was removed by filtration and the remaining medium washed with carbon tetrachloride. The filtrate was washed with 250 ml. of dilute aqueous sodium bicarbonate solution and subsequently with 250 ml. of water. The organic solution was dried, filtered and concentrated under reduced pressure giving a yellowish oil. The same reaction was carried out three times more with 50 g.,41.4 and 14.2 g. of 4-chloro-2-methyl-benzoic acid ethyl ester. The resulting material of the four reactions was combined to given a crude oily α-bromo-4-chloro-o-toluic acid ethyl ester, which slowly crystallized on standing. An analytical sample had an M.P. of 51–52° after recrystallization from ethanol.

EXAMPLE 21

To a stirred solution of 27.8 gms. of α-bromo-4-chloro-o-toluic acid ethyl ester in 100 ml. of anhydrous ether, there was added a mixture of 19.3 of N-benzylglycine ethyl ester and 14 ml. of triethylamine over a period of 15 min. After addition was complete, the mixture was heated at reflux with stirring for 25 hours. The precipitate was removed by filtration and washed with ether. The filtrate was diluted with 50 ml. of benzene and extracted twice with 100 ml. of 3 N hydrochloric acid. The aqueous extracts were combined, made alkaline by adding 3 N sodium hydroxide, and the mixture was immediately extracted twice with each 100 ml. of ether. The combined ethereal extracts were washed with water, dried, filtered and concentrated under reduced pressure, giving crude oily N-benzyl-N-(2-carbethoxy-5-chloro-benzyl)-glycine ethyl ester.

A solution of 15 g. of this crude ester in 300 ml. of azeotropically dried benzene was added under nitrogen to 2.75 g. sodium ethoxide within 20 min. After addition was complete, the stirred mixture was kept at reflux (oil bath temperature 92–95°) in a nitrogen atmosphere with slow distillation of an azeotropic mixture of ethanol-benzene, which was collected in a Dean-Stark trap. The turbid mixture soon changed to a clear solution and after a while, an amorphous material precipitated. After 4 hours, the mixture was cooled to room temperature, 200 ml. of water was added, and by addition of concd. hydrochloric acid, the aqueous layer was brought to pH 3. The organic solution was separated, and the aqueous layer was extracted twice with ether. The combined ethereal extracts were washed with water, dried over magnesium sulfate, filtered and concentrated under reduced pressure. The oily residue crystallized after standing at room temperature, and was recrystallized from ethanol to give 2-benzyl-3-carbethoxy - 7 - chloro-1,2-dihydro-4(3H)-isoquinolone, M.P. 91–93°.

The base was dissolved in an excess of freshly prepared saturated ethanolic hydrobromic acid, and upon addition of ether, crystalline hydrobromide of 2-benzyl-3-carbethoxy-7-chloro-1,2-dihydro-4(3H)-isoquinolone was precipitated which was collected by filtration, washed with ethanol-ether and dried in a desiccator, giving a crystalline material, M.P. 154–157°.

EXAMPLE 22

A solution of 1 g. of 2-benzyl-3-carbethoxy-1,2-dihydro-7-methoxy-4(3H)-isoquinolone in a mixture of 5 ml. of 6 N sodium hydroxide, 10 ml. of water and 20 ml. of ethanol was heated at 100° for 90 min. To the hot solution, excess concd. hydrochloric acid was added and heating was continued for 15 min. After cooling to room temperature, the mixture was made alkaline by adding 6 N sodium hydroxide and extracted several times with chloroform. The chloroform extracts were combined, washed with water, dried and filtered. Evaporation of the filtrate under reduced pressure gave a solid material, which was recrystallized from benzene-petroleum ether to give 2 - benzyl - 1,2 - dihydro-7-methoxy-4(3H)-isoquinolone, M.P. 141–144°.

EXAMPLE 23

A stirred solution of 16 g. of the hydrobromide of 2-benzyl - 3 - carbethoxy-7-chloro-1,2-dihydro-4(3H)-isoquinolone in a mixture of 200 ml. of concentrated hydrochloric acid and 60 ml. of ethanol was kept at reflux in a nitrogen atmosphere for 2 days. After cooling, the precipitate which had formed was collected by filtration, washed with methanol-ether and dried in a desiccator giving 2-benzyl-7-chloro-1,2-dihydro-4(3H)-isoquinolone hydrochloride, M.P. 261–264°. Recrystallization twice from methanol gave the product of melting point 262–266°.

EXAMPLE 24

A solution of 15 g. of 2-benzyl-3-carbethoxy-1,2-dihydro-6,7-dimethoxy - 4(3H) - isoquinolone hydrochloride in a mixture of 75 ml. 6 N sodium hydroxide, 150 ml. of water and 150 ml. of ethanol was kept at reflux under nitrogen for 90 min. To the hot solution, an excess of concentrated hydrochloric acid was carefully added. Heating was continued for 5 min. The solution was cooled to room temperature, excess 6 N sodium hydroxide was added, and the mixture was extracted several times with chloroform. The combined chloroform extracts were washed with water, dried, filtered, and the filtrate was concentrated under reduced pressure giving an oil, which was dissolved in excess ethanolic hydrochloric acid. Addition of ether to this solution gave 2-benzyl-1,2-dihydro-6,7-dimethoxy-4(3H)-isoquinolone hydrochloride, M.P. 220–222°.

EXAMPLE 25

To a solution of 2-benzyl-3-carbethoxy-1,2-dihydro-6,7-dimethoxy -4(3H)-isoquinolone hydrochloride in water was added excess ammonia, and the mixture was extracted with chloroform. The chloroform extract was washed, dried and evaporated to remove the solvent leaving the free base. To a solution of 9 g. of the free base in 200 ml. of 50% acetic acid was added a solution of 40 g. of mercuric acetate in 300 ml. of 50% acetic acid. The resulting mixture was stirred under nitrogen at room temperature for 15 hours. The precipitated mercurous acetate was removed by filtration, and hydrogen sulfide was passed through the filtrate. The mixture so obtained was filtered and the filtrate concentrated under reduced pressure. The residue was dissolved in ethanol, treated with excess isopropanolic hydrochloric acid, and upon addition of ether, gave a crystalline material. Recrystallization of the crystalline material from ethanol-ether gave 2-benzyl 3-carbethoxy-6,7-dimethoxy-4-hydroxy-isoquinolinium chloride, M.P. 187–188°.

EXAMPLE 26

A mixture of 16 g. of 2-benzyl-3-carbethoxy-7-chloro-1,2-dihydro-4(3H)-isoquinolone and 72 g. of mercuric acetate in 1000 ml. of 50% acetic acid was reacted as in Example 25 to give 2-benzyl-3-carbethoxy-7-chloro-4-hydroxy-isoquinolinium chloride, M.P. 154–155° (recrystallized from methanol-ether).

EXAMPLE 27

To a solution of 13.5 g. of 2-benzyl-1,2-dihydro-7-methoxy-4(3H)-isoquinolone in 400 ml. 50% acetic acid, was added a solution of 65 g. of mercuric acetate in 50% acetic acid. The mixture was stirred under nitrogen at 60° for 6 hours. Crystalline 2-benzyl-4-hydroxy-7-methoxy-isoquinolinium chloride of melting point 252–254° was recovered utilizing the technique described in Example 25. Recrystallization from methanol gave the product of melting point 251–253°.

EXAMPLE 28

To a solution of 4.5 g. of the free base of 2-benzyl-1,2-dihydro - 7 - methoxy-1-methyl-4(3H)-isoquinolone (obtained from the hydrochloride by means of sodium bicarbonate according to conventional procedures) in 120 ml. of 10% acetic acid was added a solution of 20.4 g. of mercuric acetate in 150 ml. of 10% acetic acid. The mixture was stirred at 60° under nitrogen for 19 hours. Crystalline 2 - benzyl-4-hydroxy-7-methoxy-1-methyl-isoquinolinium chloride, M.P. 243–244°, was obtained (after recrystallization from ethanol) utilizing the techniques described in Example 25.

EXAMPLE 29

A mixture of 3.8 g. of the free base of 2-benzyl-7-chloro - 1,2 - dihydro-4(3H)-isoquinolone hydrochloride (obtained from the hydrochloride by means of 6 N sodium hydroxide) and 18.3 g. of mercuric acetate in 150 ml. of 50% acetic acid was stirred under nitrogen at 55° for 15 hours. Crystalline 2-benzyl-7-chloro-4-hydroxy-isoquinolinium chloride was obtained as in Example 25, M.P. 280–285° (dec.). Upon recrystallization from methanol and drying at 65° for 3 days under reduced pressure, the product, melting point 279–281°, was obtained.

EXAMPLE 30

A solution of 3.8 g. of 2-benzyl-3-carbethoxy-7-chloro-4-hydroxy-isoquinolinium chloride in a mixture of 20 ml. of 6 N sodium hydroxide, 40 ml. of water and 40 ml. of ethanol was heated at reflux under nitrogen for 90 min. To the hot solution, there was added concentrated hydrochloric acid to bring the pH of the solution to 1. Thereafter, a mixture of 10 ml. of concentrated hydrochloric acid and 10 ml. of ethanol was added. After heating the stirred mixture at reflux overnight, the precipitated crystalline material was collected by filtration, washed with ethanol and subsequently with acetone and dried to give 2-benzyl-7-chloro - 4 - hydroxy-isoquinolinium chloride, M.P. 280–282°.

EXAMPLE 31

A solution of 6 g. of 2-benzyl-3-carbethoxy-6,7-dimethoxy-4-hydroxy-isoquinolinium chloride in a mixture of 30 ml. of 6 N sodium hydroxide, 60 ml. of water and 60 ml. of ethanol was heated at reflux for 2 hours. By addition of concentrated hydrochloric acid to the so-formed hot solution, the pH was brought to 1. The precipitating crystalline material which appeared was dissolved by adding a mixture of 15 ml. of concentrated hydrochloric acid and 15 ml. of ethanol to the reaction mixture. After refluxing for another 90 min., the solution was cooled to room temperature, and the crystalline precipitate was collected by filtration to give 2-benzyl-6,7-dimethoxy-4-hydroxy-isoquinolinium chloride, M.P. (235–236°. Recrystallization from ethanol and drying at 72° under reduced pressure for 20 hours gave the product 2-benzyl-6,7-dimethoxy-4-hydroxy-isoquinolinium chloride, M.P. 238–239°.

EXAMPLE 32

A mixture of 1 g. of 2 - benzyl-7-chloro-4-hydroxy-isoquinolinium chloride and 0.4 g. of 10% palladium-on-charcoal in 100 ml. of ethanol was hydrogenated at room temperature and atmospheric pressure for 6 hours. After removing the catalyst by filtration and concentrating the filtrate, the residue was dissolved in methanol and treated with an excess of isopropanolic hydrochloric acid. Addition of ether to the solution gave crystalline 4-hydroxy-isoquinoline hydrochloride, M.P. 202–204°. Recrystallization from ethanol-ether gave the product, melting point 207–208°.

EXAMPLE 33

A solution of 4 g. of the free base of 2-benzyl-1,2-dihydro-6,7-dimethoxy-4(3H)-isoquinolone obtained from the hydrochloride by means of sodium bicarbonate, in 40 ml. of 48% aqueous hydrobromic acid was heated at 120° for 1.5 hr. After cooling, 40 ml. of glacial acetic acid was added, and the solution was kept at reflux for 2.5 hr. The solvent was removed under reduced pressure, and the solid residue was washed with ethanol and subsequently with acetone. Recrystallization from methanol gave 2-benzyl-1,2-dihydro - 6 - hydroxy-7-methoxy-4(3H)-isoquinolone hydrobromide, M.P. 229–231°.

EXAMPLE 34

A mixture of 2 g. of 2-benzyl-4-hydroxy-7-methoxy-isoquinolinium chloride and 0.8 g. of 10% palladium-on-charcoal in 140 ml. of glacial acetic acid was hydrogenated at 70° under atmospheric pressure for 6 hours. After cooling to room temperature and removal of the catalyst by filtration, the filtrate was concentrated under reduced pressure giving a solid residue, which was recrystallized twice from methanol to give 4-hydroxy-7-methoxy-isoquinoline hydrochloride, M.P. 279–280°.

EXAMPLE 35

A mixture of 4 g. of 2-benzyl-6,7-dimethoxy-4-hydroxy-isoquinolinium chloride and 1.2 g. of 10% palladium-on-charcoal in 400 ml. of ethanol was hydrogenated at room temperature and under atmospheric pressure for 6 hours. After removal of the catalyst by filtration, the filtrate was concentrated to 150 ml. The crystalline precipitate which had formed was collected by filtration and recrystallized from methanol to give 6,7-dimethoxy-4-hydroxy-isoquinoline hydrochloride, M.P. 264–265°.

EXAMPLE 36

A suspension of 9.9 g. of 2-benzyl-3-carbethoxy-1,2-dihydro-6,7-dimethoxy-4(3H)-isoquinolone hydrochloride was treated with ammonium hydroxide solution and extracted several times with chloroform. The combined chloroform extracts were washed with water, dried, filtered and concentrated under reduced pressure. The free base of 2-benzyl-3-carbethoxy1,2-dihydro-6,7-dimethoxy-4(3H)-isoquinolone hydrochloride thus obtained was dissolved in a mixture of 20 ml. of ethanol and 20 ml. of ethyl acetate. To the stirred solution was added with external cooling over a period of 4 hours, 1.4 g. of sodium borohydride at a rate to keep the temperature at 0°. After completion of this addition, the mixture was kept in the refrigerator (5° C.) for 15 hours. The solvent was removed under reduced pressure, the residue was treated with water and left standing at room temperature for 1 hour. After extraction with chloroform, the combined chloroform solution was dried, filtered and concentrated under vacuum. The residue was dissolved in ether and upon addition isopropanolic hydrogen chloride, a crystalline precipitate was obtained, which after recrystallization from methanol was found to be 2-benzyl-3-carbethoxy-6,7-dimethoxy-4-hydroxy - 1,2,3,4 - tetrahydroisoquinoline hydrochloride, M.P. 198°.

EXAMPLE 37

The free base of 2-benzyl-3-carboxy-1,2-dihydro-6,7-dimethoxy-4(3H)-isoquinolone hydrochloride prepared from 4.5 g. of 2-benzyl-3-carbethoxy-1,2-dihydro-6,7-dimethoxy-4(3H)-isoquinolone hydrochloride as in Example 36 was dissolved in 200 ml. of a 1:1 mixture of ethanol and methanol. To the stirred solution, there was added 5 g. of sodium borohydride over a period of 30 min., during which time the temperature of the reaction mixture rose to 40–50°. The mixture was left standing at room temperature overnight. The solvent was removed under reduced pressure. The residue was treated with water and left standing for one hour at room temperature. After extraction several times, the combined chloroform extracts were dried, filtered and concentrated under vacuum. The residue was chromatographed on a silca gel column (Grace-Davison, Grade 923). Elution with 600 ml. of benzene-ethyl acetate (9:1), followed by 400 ml. of benzene-ethyl acetate (8.2) gave the free base of 2-benzyl - 3 - carbethoxy - 6,7 - dimethoxy-4-hydroxy-1,2,3,4-tetrahydroisoquinoline hydrochloride. Elution with 600 ml. of benzene-methanol (1:1) gave an oil which was dissolved in ether and treated with an excess of isopropanolic hydrochloric acid to give crystalline 2-benzyl-6,7-dimethoxy - 4 - hydroxy - 3 - hydroxymethyl - 1,2,3,4-tetrahydroisoquinoline hydrochloride, M.P. 198–199°. Upon recrystallization of the last-mentioned product from ethanol-ether, it was found to have a melting point of 200–201°.

EXAMPLE 38

A solution of 2 g. of the free base of 2-benzyl-3-carbethoxy-6,7-dimethoxy - 4 - hydroxy - 1,2,3,4-tetrahydroisoquinoline (prepared from the hydrochloride by means of sodium bicarbonate in 30 ml. of tetrahydrofuran) was added with stirring under nitrogen to an ice-cold slurry of 0.9 g. of lithium aluminum hydride in 30 ml. of tetrahydrofuran. After the addition was complete, the mixture was heated at reflux for 5 hours. The excess lithium aluminum hydride was destroyed by adding a saturated aqueous solution of sodium sulfate to the solution. Anhydrous sodium sulfate was added, the etheral solution was filtered, and the filtrate was concentrated under reduced pressure. The residue was dissolved in ether and treated with isopropanolic hydrochloric acid to give a crystalline precipitate. Recrystallization of the crystalline precipitate from ethanol-ether gave 2-benzyl-6,7-dimethoxy-4-hydroxy-3-hydroxymethyl-1,2,3,4-tetrahydroisoquinoline hydrochloride, M.P. 199–200°.

EXAMPLE 39

To a suspension of 2.09 g. of 2-benzyl-3-carbethoxy-1,2-dihydro - 7 - methoxy - 4(3H) - isoquinolone in 10 ml. of ethyl acetate and 10 ml. of ethanol was added in the cold, a slurry of 342 mg. of sodium borohydride in 5 ml. of ethanol. The temperature of the stirred mixture rose to 40–50° within one hour. After cooling, 1 g. of sodium borohydride was added and the mixture was stirred at room temperature overnight. The solvent was removed under reduced pressure, the residue was treated with water, left standing at room temperature for 30 min., and extracted with chloroform. The combined organic solution was washed with water, dried, filtered and concentrated under reduced pressure to give a solid residue. Recrystallization from benzene gave crystalline 2 - benzyl - 4 - hydroxy - 3 - hydroxymethyl - 7 - methoxy-1,2,3,4-tetrahydroisoquinoline, M.P. 130–131°.

EXAMPLE 40

Dry hydrochloric acid was passed through a solution of 8 g. of 1,2-dihydro-7-methoxy-1-methyl-4(3H)-isoquinolone and 16 g. of ethanedithiol in 220 ml. of glacial acetic acid for 40 min. After standing overnight at room temperature, a crystalline precipitate was obtained which was collected by filtration and recrystallized from methanol giving 1',2'-dihydro - 7' - methoxy - 2' - methylspiro-[1,3 - dithiolane - 2,4'(3'H)-isoquinoline] hydrochloride, M.P. 252–253°.

EXAMPLE 41

Using the technique described in Example 40, 1',2'-dihydro - 1',2' - dimethyl - 7' - methoxyspiro[1,3 - dithiolane-2,4'(3'H)-isoquinoline] hydrochloride, melting point 193–194°, was obtained from 2 g. of 1,2-dihydro-1,2-dimethyl-7-methoxy-4-(3H)isoquinolone.

EXAMPLE 42

Dry hydrochloric acid was passed through a solution of 2.5 g. of the free base of 2-benzyl-1,2-dihydro-6-hydroxy-7-methoxy-4-(3H)-isoquinolone prepared from the hydrobromide by means of sodium bicarbonate, and 6 ml. ethanedithiol in 200 ml. glacial acetic acid for 40 min. After heating for 4 hours at 60°, the mixture was left standing at room temperature overnight. The precipitated hydrochloride of unreacted isoquinolone starting material was removed by filtration and the filtrate was concentrated under reduced pressure to give 0.85 g. of oily residue. This was chromatographed on a silica gel column (Silica Gel, Grace-Divison, Grade 923). Elution with 3 l. of a mixture of benzene/ethyl acetate (95:5) gave an oil which was dissolved in methanol and treated with isopropanolic hydrochloric acid giving crystalline 2'-benzyl - 1',2' - dihydro - 6' - hydroxy - 7' - methoxyspiro[1,3 - dithiolane - 2,4' - (3'H) - isoquinoline] hydrochloride, M.P. 225–226°. Recrystallization of the product from methanol-ether gave pure 2'-benzyl-1',2'-dihydro-6'-hydroxy - 7' - methoxyspiro[1,3 - dithiolane - 2,4 - (3'H)-isoquinoline] hydrochloride, M.P. 220–221°.

EXAMPLE 43

To a solution of 0.5 g. of 1',2'-dihydro-1',2'-dimethyl-7'-methoxyspiro[1,3-dithiolane - 2,4'(3'H)-isoquinoline] hydrochloride in 20 ml. of ethanol was added 5 g. of Raney nickel. The mixture was refluxed for 4 hours. The catalyst was removed by filtration, and the filtrate was concentrated under reduced pressure. The residue was dissolved in ether. Isopropanolic hydrochloric acid was then added slowly. The crystalline precipitate was collected by filtration and recrystallized from acetonitrile-ether to give 1,2 - dimethyl-7-methoxy-1,2,3,4 - tetrahydroisoquinoline hydrochloride, M.P. 168–170°.

EXAMPLE 44

Treating 1',2'-dihydro - 7' - methoxy - 2' - methylspiro[1,3-dithiolane-2,4'(3'H)-isoquinoline] hydrochloride in the manner described in Example 43, 7-methoxy-2-methyl-1,2,3,4-tetrahydroisoquinoline hydrochloride, M.P. 207–208°, was obtained after recrystallization from ethanol ether.

EXAMPLE 45

A mixture of 1.7 g. of the free base of 1,2-dihydro-7-methoxy-2-methyl-4(3H)-isoquinolone and 0.5 g. of 10% palladium on charcoal in 100 ml. of glacial acetic acid was hydrogenated at 99° and 80 atm. until the hydrogen uptake ceased. The catalyst was removed by filtration and the filtrate was concentrated under reduced pressure. The oily residue was dissolved in ethanol and treated with excess isopropanolic hydrogen chloride. Addition of ether gave crystalline 7-methoxy - 2 - methyl-1,2,3,4-tetrahydroisoquinoline hydrochloride, M.P. 205–207°.

EXAMPLE 46

To a solution of 0.36 g. of 2'-benzyl-1',2'dihydro-6'-hydroxy - 7' - methoxyspiro[1,3-dithiolane-2,4'(3'H)-isoquinoline] prepared from the hydrochloride by means of sodium bicarbonate, in 50 ml. of ethanol was added 3.5 g. of Raney nickel. The mixture was hydrogenated under atmospheric pressure at 58–60°. After 20 hours, 3 g. more of Raney nickel was added, and the hydrogenation was continued for 20 hours at 58–60°. The catalyst was removed by filtration, and the filtrate evaporated to dryness under reduced pressure. Recrystallization of the solid residue from methanol-ether gave 6-hydroxy-7-methoxy-1,2,3,4-tetrahydroisoquinoline, M.P. 262–263°.

EXAMPLE 47

To a solution of 3.6 g. of 7-methoxy-1,2,3,4-tetrahydro-4-isoquinolinol, propionate, hydrochloride in 100 ml. of glacial acetic acid was added 400 mg. of 10% palladium on charcoal. The mixture was hydrogenated at room temperature and atmospheric pressure until the hydrogen uptake was completed (4 hours). The catalyst was removed by filtration and the filtrate evaporated to dryness under reduced pressure. The crystalline residue was washed with ether and recrystallized from ethanol-methanol to give 7-methoxy-1,2,3,4-tetrahydro-4-isoquinolino, propionate hydrochloride, M.P. 183–184°.

EXAMPLE 48

A mixture of 14 g. of 2-benzyl-1,2-dihydro-7-methoxy-4(3H)-isoquinolone in 100 ml. of 48% aqueous hydrobromic acid was heated at 120° with stirring for 2 hours. After addition of 100 ml. of glacial acetic acid, heating at reflux was continued for another 3 hours. Evaporation of the solvent under reduced pressure gave a solid residue which was recrystallized from methanol giving crystalline 2-benzyl-1,2-dihydro - 7 - hydroxy-4(3H)-isoquinolone hydrobromide, M.P. 243–244°. Recrystallization twice from methanol gave pure 2-benzyl-1,2-dihydro-7-hydroxy-4(3H)-isoquinolone hydrobromide, M.P. 246–248° (dec.) with starting sublimation at 225°.

EXAMPLE 49

2-benzyl-1,2-dihydro - 7 - methoxy - 1 - methyl-4(3H)-isoquinolone was treated in the manner described in Example 48 to obtain 2-benzyl-1,2-dihydro - 7 - hydroxy-1-methyl-4(3H)-isoquinolone hydrobromide, M.P. 254–255°, after recrystallization from methanol.

EXAMPLE 50

To a suspension of 1.25 g. of lithium aluminum hydride in 35 ml. of anhydrous tetrahydrofuran was added slowly a solution of 3 g. of the free base of 2-benzyl-1,2-dihydro-7-hydroxy-4-(3H)-isoquinolone obtained from the hydrobromide by means of treatment of the latter with sodium bicarbonate in 60 ml. of anhydrous tetrahydrofuran. The mixture was refluxed for 4 hrs. under nitrogen. After cooling excess lithium aluminum hydride was destroyed by adding a saturated aqueous solution of sodium sulfate. The ethereal layer was decanted, dried and filtered. Addition of excess isopropanolic hydrochloride to the solution gave the crystalline hydrochloride which was twice recrystallized from methanol giving 2-benzyl-1,2,3,4-tetrahydro-4,7-isoquinolinediol hydrochloride of M.P. 180–181°.

EXAMPLE 51

A stirred solution of 12 g. of 2-benzyl-1,2-dihydro-6,7-dimethoxy-4(3H)-isoquinolone in 350 ml. of 48% aqueous hydrobromic acid was heated at 125° for 5 hours. Removal of the solvent under vacuum gave a crystalline residue which was recrystallized from methanol-ether to 2-benzyl-6,7-dihydroxy-1,2-dihydro - 4(3H) - isoquinolone hydrobromide. The product melted at 234–236°.

EXAMPLE 52

To a solution of 1.2 g. of 1,2-dihydro-7-methoxy-2-methyl-4(3H)-isoquinolone, in 20 ml. of ethanol, there was added 0.6 g. sodiumborohydride. After stirring the mixture at room temperature for 6 hrs., the solvent was removed in vacuo and 30 ml. of water were added to the residue. The mixture was then extracted with ether, the organic layers were washed with water and dried over sodium sulfate.

After addition of isopropanolic hydrochloric acid to the ethereal solution, a crystalline precipitate was obtained which was recrystallized three times from ethanol giving 1,2,3,4 - tetrahydro-7-methoxy-2-methyl-4-isoquinolinol hydrochloride, M.P. 173–174°.

EXAMPLE 53

To a solution of 25 g. of 2-benzyl-1,2-dihydro-7-methoxy-4(3H)-isoquinolone in 400 ml. methanol, there was added 15 g. of sodium borohydride. The mixture was stirred overnight at room temperature and then evaporated to dryness in vacuo. To the residue was added 200 ml. of water and the mixture was extracted with ether. After drying over sodium sulfate, the combined organic layers were treated with isopropanolic hydrochloric acid to give 1,2,3,4-tetrahydro-2-benzyl-7-methoxy-4-isoquinolinol hydrochloride, M.P. 182–184°.

EXAMPLE 54

To a solution of 1 g. of 2-benzyl-1,2-dihydro-7-methoxy-4(3H)-isoquinolone in 30 ml. of abs. tetrahydrofuran, there was added 850 mg. of lithium aluminum hydride. The mixture was refluxed for 12 hours. After decomposing the excess $Li AlH_4$ with ethyl acetate and methanol, the mixture was diluted with water and extracted three times with methylene chloride. The combined organic layers were washed with water, dried over sodium sulfate and evaporated to dryness in vacuo. The oily residue was dissolved in an excess of 1 N methanolic hydrochloric acid. Addition of ether produced 1,2,3,4-tetrahydro-2-benzyl-7-methoxy-4-isoquinolinol hydrochloride, M.P. 181–183°.

EXAMPLE 55

To a solution of 4.3 g. of 1,2-dihydro-7-methoxy-1,2-dimethyl-4(3H)-isoquinolone liberated from the hydrochloride thereof by means of 6 N sodium hydroxide in 60 ml. ethanol, there was added 2.5 g. of sodium borohydride. The resulting mixture was stirred overnight at room temperature. After evaporation to dryness in vacuo and addition of 100 ml. of water to the residue, the mixture was extracted with ether several times. Addition of isopropanolic hydrochloric acid to the combined dried ether extracts produced an oil, which could be crystallized with isopropanol giving 1,2,3,4-tetrahydro-7-methoxy-1,2-dimethyl-4-isoquinolinol hydrochloride, M.P. 159–161°. After recrystallization from isopropanol, the product melted at 159–161°.

EXAMPLE 56

To a solution of 3 g. of 2-benzyl-1,2-dihydro-7-methoxy-1-methyl-4(3H)isoquinolone in 20 ml. of ethanol there was added 1.5 g. of sodium borohydride. After stirring at room temperature for 6 hrs. and standing overnight, the mixture was evaporated to dryness in vacuo, treated with 100 ml. of water and extracted with ether. To the combined and dried ethereal extracts, isopropanolic hydrochloric acid was added and the oily precipitate was crystallized from acetone. Recrystallization from acetone/ethanol gave 2-benzyl - 1,2,3,4 - tetrahydro-7-methoxy-1-methyl - 4 - isoquinolinol hydrochloric, M.P. 169–170°.

EXAMPLE 57

To a solution of 1.4 g. of 1,2-dihydro-7-methoxy-2-methyl-1-phenyl-4(3H)-isoquinolone in 30 ml. ethanol, there was added 1 g. of sodium borohydride and the mixture was stirred at room temperature overnight. Removal of the solvent in vacuo and addition of water to the residue was followed by several extractions with ether. The combined ethereal layers were washed with water and dried over sodium sulfate. Addition of isopropanolic hydrochloric acid produced oily hydrochloride, namely, 1,2,3,4-tetrahydro-7-methoxy-2-methyl-1-phenyl-4-isoquinolinol hydrochloride, which was crystallized from isopropanol. Recrystallization from isopropanol afforded 1,2,3,4-tetrahydro-7-methoxy-2-methyl-1-phenyl-4-isoquinolinol hydrochloride, M.P. 173–174°.

EXAMPLE 58

A mixture of 3 g. of 2-benzyl-1,2,3,4-tetrahydro-7-methoxy-1-methyl-4-isoquinolinol liberated from the hydrochloride thereof by means of sodium bicarbonate, 6 ml. of propionic acid anhydride and two drops of pyridine was heated at 100° with stirring for 3 hours. The cooled mixture was poured into water and an excess of 6 N sodium hydroxide was added. The aqueous solution was extracted three times with ether. The combined organic layers were washed with water and dried over sodium sulfate. Addition of excess isopropanolic hydrochloric acid to the ethereal solution produced the crystalline hydrochloride, which was recrystallized twice from ethanol giving 2-benzyl-1,2,3,4-tetrahydro-7-methoxy-1-methyl-4-isoquinolinol, propionate hydrochloride, M.P. 180–181°.

EXAMPLE 59

A mixture of 10 g. of 1,2,3,4 - tetrahydro-2-benzyl-7-methoxy-4-isoquinolinol liberated from the hydrochloride thereof by means of sodium bicarbonate, 25 ml. propionic acid anhydride and a few drops of pyridine was heated at 100° with stirring for 4 hours. The cooled mixture was poured into water and made basic with sodium bicarbonate. The aqueous solution was extracted with ether several times and the combined ether extracts were dried over sodium sulfate. Addition of excess isopropanolic hydrochloric acid to the ethereal solution produced the crystalline hydrochloride, which was recrystallized from ethanol, yielding 2-benzyl-1,2,3,4-tetrahydro-7-methoxy-4-isoquinolinol, propionate hydrochloride, M.P. 174–175°. The product melted at 177–178° after recrystallization from ethanol.

EXAMPLE 60

To a solution of 3.6 g. of 2-benzyl-1,2,3,4-tetrahydro-7-methoxy-4-isoquinolinol propionate hydrochloride in 100 ml. glacial acetic acid was added 400 mg. of 10% palladium on charcoal and the mixture was hydrogenated at room temperature and normal pressure for 4 hours. After this time the hydrogen uptake was completed. The catalyst was filtered and the filtrate evaporated to dryness in vacuo. The crystalline residue was washed with ether. Recrystallization from ethanol/methanol afforded 1,2,3,4-tetrahydro-7-methoxy-4-isoquinolinol, propionate hydrochloride, M.P. 183–184°. The product melted at 184–185° after another recrystallization from ethanol.

EXAMPLE 61

A solution of 4.07 g. of 2-benzyl-6,7-dimethoxy-4-hydroxy-1,2,3,4-tetrahydro-3-isoquinoline carboxylic acid ethyl ester hydrochloride in 40 ml. of 1 N methanolic sodium hydroxide was left standing overnight. After addition of 35 ml. of 1 N ethanolic hydrogen chloride to the solution, the solvents were removed under reduced pressure. The residue was suspended in dichloromethane and the clear solution after removal of the insoluble parts was evaporated to dryness. Addition of methanol to the residue gave crystalline material (M.P. 189–191° which was suspended in methanol. Addition of excess isopropanolic hydrogen chloride to the suspension gave a clear solution. Upon addition of ether to this solution, crystalline 2-benzyl-6,7-dimethoxy-4-hydroxy - 1,2,3,4 - tetrahydro-3-isoquinoline carboxylic acid hydrochloride, M.P. 214–215° was obtained. Recrystallization from methanol/ether raised the M.P. to 215–216°.

We claim:

1. A compound of the formula

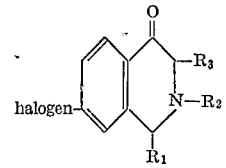

wherein $R_1$ is selected from the group consisting of hydrogen, lower alkyl, phenyl and halophenyl; $R_2$ is selected from the group consisting of hydrogen, lower alkyl, benzyl, $\alpha$-lower alkyl-benzyl, ortho-, meta- or para- lower alkyl-benzyl and ortho, meta- or para-halobenzyl; $R_3$ is selected from the group consisting of hydrogen, lower alkoxy-carbonyl and carboxy and the pharmaceutically acceptable salts thereof.

2. The compound of claim 1 wherein $R_1$ is hydrogen, $R_2$ is benzyl, $R_3$ is hydrogen and the halogen atom is chlorine, i.e., a compound of the formula 2-benzyl-7-chloro-1,2-dihydro-4(3H)-isoquinolone.

3. The compound of claim 1 wherein $R_1$ is hydrogen, $R_2$ is benzyl, $R_3$ is carbethoxy, and the halogen atom is chlorine, i.e., a compound of the formula 2-benzyl-3-carbethoxy-7-chloro-1,2-dihydro-4(3H)-isoquinolone.

References Cited

UNITED STATES PATENTS 3,457,266   7/1969   Gibas et al. _____ 260—289
3,480,634   11/1969  Finkelstein _____ 260—289

OTHER REFERENCES

Friedman et al., abstracted in Chem. Abstr., vol. 59 (1963), col. 497.

Grethe et al., Jour. Org. Chem., vol. 33, pp. 494–503 (1968).

Hinton et al., abstracts in Chem. Abstr., vol. 53, cols. 15082–85 (1959).

DONALD G. DAUS, Primary Examiner

U.S. Cl. X.R.

260—283 S, 286 R, 286 Q, 289 R, 471 A, 473 R 521, 592, 687; 424—258

UNITED STATES PATENT OFFICE
CERTIFICATE OF CORRECTION

PO-1050
(5/69)

Patent No. 3,629,265      Dated 12/21/71

Inventor(s) Grethe, Lee and Uskokovic

It is certified that error appears in the above-identified patent and that said Letters Patent are hereby corrected as shown below:

Column 2, line 25

Reaction Scheme numbered   No"I"

should be   No II

Column 2, line 33

"eg NBS⟩ "     should be     ⟨ eg NBS

Column 2, line 59

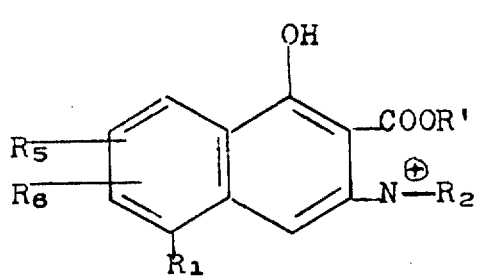 should be 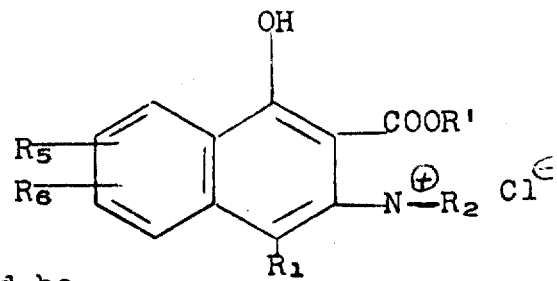

PO-1050
(5/69)

UNITED STATES PATENT OFFICE
CERTIFICATE OF CORRECTION

Patent No. 3,629,265                     Dated 12/21/71

Inventor(s)     Grethe, Lee and Uskokovic

It is certified that error appears in the above-identified patent and that said Letters Patent are hereby corrected as shown below:

Column 3, line 55

"preportion"      should be     proportion

Column 6, line 24

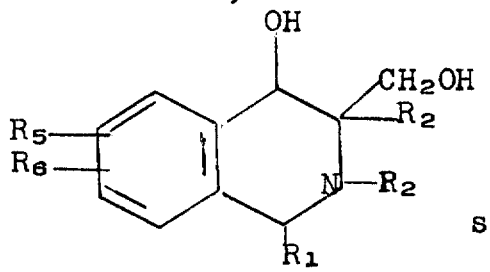       should be      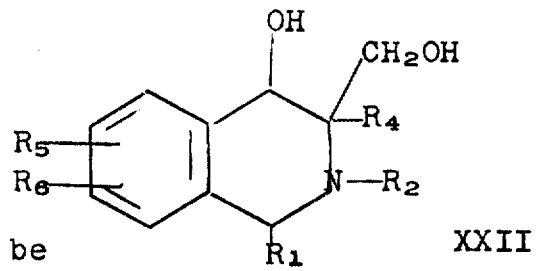     XXII

Column 7, line 1

"cartoid"      should be     carotid

Column 11 footnote

"Manson"      should be     Mason

Column 13, line 64

"combined to given a"      should be     combined to give a

UNITED STATES PATENT OFFICE
CERTIFICATE OF CORRECTION

Patent No. 3,629,265  Dated 12/21/71

Inventor(s) Grethe, Lee and Uskokovic

It is certified that error appears in the above-identified patent and that said Letters Patent are hereby corrected as shown below:

Column 13, line 72

"19.3 of"   should be   19.3 g of

Column 17, line 31

"3-carboxy"   should be   3-carbethoxy

Column 17, line 48

"(8.2)"   should be   (8:2)

Column 18, line 61

"dithiolane-2,4-"   should be   dithiolane-2,4'-

Column 20, line 5

"isopropanolic hydrochloride"

should be isopropanolic hydrogen chloride

Signed and sealed this 20th day of June 1972.

(SEAL)
Attest:

EDWARD M. FLETCHER, JR.        ROBERT GOTTSCHALK
Attesting Officer              Commissioner of Patents